(12) United States Patent
Tabatabai et al.

(10) Patent No.: US 7,203,692 B2
(45) Date of Patent: Apr. 10, 2007

(54) TRANSCODING BETWEEN CONTENT DATA AND DESCRIPTION DATA

(75) Inventors: Ali Tabatabai, Cupertino, CA (US); Toby Walker, San Jose, CA (US); Mohammed Visharam, San Jose, CA (US); Hawley K. Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1101 days.

(21) Appl. No.: 10/114,891

(22) Filed: Apr. 1, 2002

(65) Prior Publication Data

US 2003/0031260 A1    Feb. 13, 2003

Related U.S. Application Data

(60) Provisional application No. 60/305,938, filed on Jul. 16, 2001.

(51) Int. Cl.
*G06F 17/10* (2006.01)
(52) U.S. Cl. ................................ 707/102; 707/100
(58) Field of Classification Search .................... 707/1, 707/104.1, 100–102
See application file for complete search history.

(56) References Cited

U.S. PATENT DOCUMENTS

| | | | |
|---|---|---|---|
| 5,579,471 A | 11/1996 | Barber et al. | |
| 5,953,506 A | 9/1999 | Kaltra et al. | |
| 6,233,253 B1 | 5/2001 | Settle et al. | |
| 6,240,097 B1 | 5/2001 | Wesolek et al. | |
| 6,492,998 B1 | 12/2002 | Kim et al. | |
| 2002/0090029 A1 | 7/2002 | Kim | |
| 2002/0143972 A1 | 10/2002 | Christopoulos et al. | |
| 2002/0152117 A1 | 10/2002 | Cristofalo et al. | |
| 2003/0193994 A1* | 10/2003 | Stickler | 375/150 |

FOREIGN PATENT DOCUMENTS

WO    WO 01/31497 A1    5/2001

OTHER PUBLICATIONS

Michelle Kim, Steve Wood, Lai-tee Cheok, 'Extensible MPEG-4 Textual Format (XMT)', ACM Multimedia Workshop 2000, pp. 71-74.
Devillers, S., "XML and XSLT Modeling For Multimedia Bitstream Manipulation", May 2001, pp. 1-2, XP002245841.

* cited by examiner

*Primary Examiner*—Alford W. Kindred
(74) *Attorney, Agent, or Firm*—Blakely, Sokoloff, Taylor & Zafman LLP

(57) ABSTRACT

Transcoding between content data and description data. The transcoding may include transcoding content data to corresponding description data. Additional description information to complete the description data may be requested. The transcoding may include transcoding description data to content data, including seeking content data items that match the description data. Content data items that best match the description data may be selected and included in the content data. A user may be requested to select items from a group of matching content data items. The content data may be stored according to the Moving Pictures Expert Group-4 (MPEG-4) standard, and the description data may be stored according to the MPEG-7 standard. The transcoding may be achieved via rules stored in the Extensible Stylesheet Transformation (XSLT) format. The transcoding may be implemented on a computing device, such as a personal computer.

123 Claims, 8 Drawing Sheets

```
<smil xmlns:mp7="urn:mpeg:mpeg7:schema:2001"
xmlns:xsi="http://www.w3.org/2001/XMLSchema-instance">
  <head>
    <layout>  404
      <root-layout width="376" height="268" background-color="white"/>
      <region id="b11" left="0%" top="0%" width="33%"  402
height="33%" fit="meet" z-index="5"/>
      <region id="b12" left="33%" top="0%" width="33%"  402
height="33%" fit="fill" z-index="5"/>
    </layout>
  </head>
  <body>
    <par dur="20s">  410
      <!-- Play these streams concurrently (in parallel).  -->
      <img src="image1.gif" region="b11" fill="freeze"/>  406
      <img src="image2.gif" region="b12" fill="freeze"/>  408
    </par>
  </body>
</smil>
```

```
<mp7:mpeg7 >
   <mp7:ContentDescription xsi:type="mp7:ContentEntityType">
      <mp7:MultimediaContent xsi:type="mp7:MultimediaType">
         <mp7:Multimedia>
            <mp7:MultimediaSegment>
               <mp7:MediaLocator>
                  <mp7:MediaUri>file:example.smil</mp7:MediaUri>
               </mp7:MediaLocator>
               <mp7:MediaSourceDecomposition>    424
                  <mp7:Segment xsi:type="mp7:MultimediaSegmentType">
                     <mp7:MediaSourceDecomposition>
                        <mp7:Segment xsi:type="mp7:StillRegionType">
                           <mp7:MediaLocator>
                              <mp7:MediaUri>image1.gif</mp7:MediaUri>    442
                           </mp7:MediaLocator>
                           <mp7:SpatialMask>
                              <mp7:SubRegion>
                                 <mp7:Box>0% 0% 33% 33% </mp7:Box>              448
                              </mp7:SubRegion>
                           </mp7:SpatialMask>
                           <mp7:VisualDescriptor xsi:type="mp7:DominantColorType">
                              <mp7:ColorSpace type="RGB"/>
                              <mp7:ColorQuantization>
                                 <Component>R</Component>
                                 <Component>G</Component>
                                 <Component>B</Component>
                                 <NumOfBins>3</NumOfBins>
                              </mp7:ColorQuantization>
                              <!-- Black? -->
                              <mp7:Value>
                                 <mp7:Percentage>15</mp7:Percentage>
                                 <mp7:Index>0 0 0</mp7:Index>
                              </mp7:Value>
                              <!--- Red -->
                              <mp7:Value>
                                 <mp7:Percentage>15</mp7:Percentage>
                                 <mp7:Index>2 2 2</mp7:Index>
                              </mp7:Value>
                           </mp7:VisualDescriptor>
                        </mp7:Segment>
                        <mp7:Segment xsi:type="mp7:StillRegionType">
                           <mp7:MediaLocator>
                              <mp7:MediaUri>image2.gif</mp7:MediaUri>    452
                           </mp7:MediaLocator>
                           <mp7:SpatialMask>
                              <mp7:SubRegion>
                                 <mp7:Box>33% 0% 33% 33% </mp7:Box>
                              </mp7:SubRegion>
                           </mp7:SpatialMask>
                        </mp7:Segment>
                     </mp7:MediaSourceDecomposition>
                  </mp7:Segment>
               </mp7:MediaSourceDecomposition>
            </mp7:MultimediaSegment>
         </mp7:Multimedia>
      </mp7:MultimediaContent>
   </mp7:ContentDescription>
</mp7:mpeg7>
```

810  ⎧ <xsl:template match="par|seq">
     ⎪   <mp7:Segment xsi:type="mp7:MultimediaSegmentType">   ← 814
     ⎨     <mp7:MediaSourceDecomposition>                    
     ⎪       <xsl:apply-templates/>                          812
     ⎪     </mp7:MediaSourceDecomposition>
     ⎪   </mp7:Segment>
     ⎩ </xsl:template>

820  ⎧ <xsl:template match="img">
     ⎪   <mp7:Segment xsi:type="mp7:StillRegionType">   ← 824
     ⎪     <mp7:MediaLocation>                          822
     ⎪       <mp7:MediaUri><xsl:value-of
     ⎪         select="@src"/></mp7:MediaUri>
     ⎨     </mp7:MediaLocation>
     ⎪     <mp7:SpatialMask>
     ⎪       <mp7:SubRegion>
     ⎪         <xsl:variable name="region"
     ⎪           select="key('idref',@region)"/>
     ⎪         <xsl:call-template name="region-to-box">
     ⎪           <xsl:with-param name="region"
     ⎪             select="$region"/>
     ⎪         </xsl:call-template>
     ⎪       </mp7:SubRegion>
     ⎪     </mp7:SpatialMask>
     ⎪   </mp7:Segment>
     ⎩ </xsl:template>
```

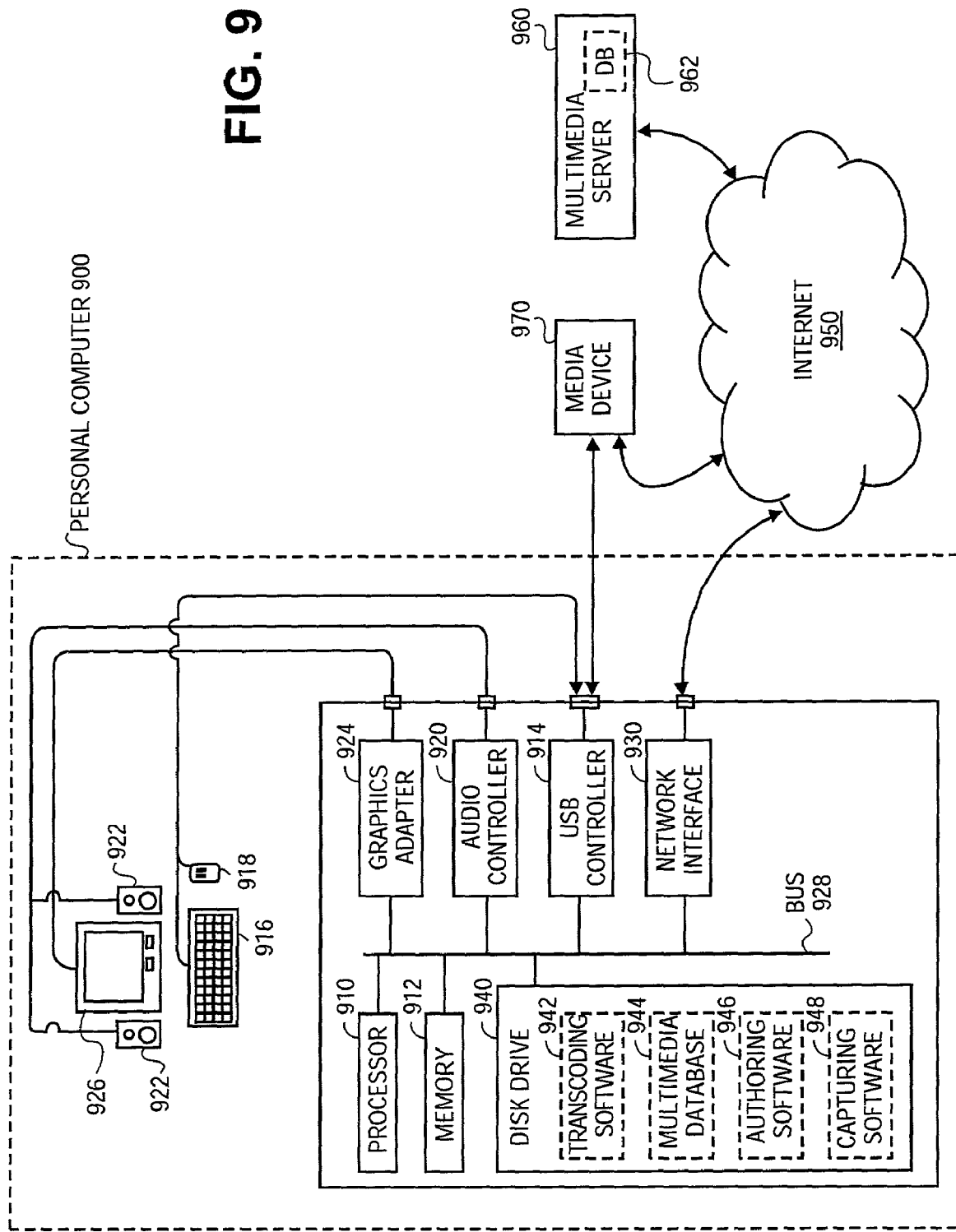

TRANSCODING BETWEEN CONTENT DATA AND DESCRIPTION DATA

RELATED APPLICATION

This application claims the benefit of U.S. Provisional Application No. 60/305,938 filed Jul. 16, 2001, which is incorporated herein by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©2001–2002, Sony Electronics, Inc., All Rights Reserved.

BACKGROUND

1. Field of the Invention

This invention relates to the creation and manipulation of multimedia data, and more particularly to transcoding between multimedia content data and multimedia description data.

2. Background

Digital multimedia content is increasingly available via the Internet, digital television, and so on. To support ubiquitous digital multimedia content, a key requirement is a standard representation of multimedia information. On the Internet, the hypertext markup language (HTML) and Synchronized Media Integration Language (SMIL) are common standards for representing multimedia content. HTML is Standard Generalized Markup Language (SGML) based standard defined by the World Wide Web Consortium (W3C). HTML describes a Web page as a set of media elements or resources, such as images, video, audio, and JAVA® applications, together with a presentation structure. The presentation structure includes information about the intended presentation of the media resources when the HTML web page is displayed in an Internet browser. This includes, for example, information about the layout of the different multimedia elements. HTML uses nested tags to represent the presentation structure. A more recent version of HTML called XHTML is a functionally equivalent version of HTML that is based on XML rather than SGML.

The W3C has promulgated SMIL, an XML-based language for integrating different media resources such as images, video, audio, etc. into a single presentation. SMIL contains features that allow for referencing media resources and controlling their presentation including timing and layout, and features for linking to other presentations in order to create hypermedia presentations. SMIL is strictly an integration language which does not define any representations for the media resources or objects used in a presentation. Instead, SMIL defines a set of tags that allow media resources to be integrated together into a single presentation. While some SMIL features exist in HTML, SMIL focuses on the spatial and temporal layout of media resources and provides greater control of interactivity than HTML.

Digital multimedia information is becoming widely distributed though broadcast transmission via, for example, digital television signals and interactive transmission via, for example, the Internet. The multimedia information may be still images, audio feeds, or video data streams. However, the availability of a large volume of multimedia information has led to difficulties in identifying content that is of particular interest to a user. Various organizations have attempted to deal with the problem by providing a description of the content of the multimedia information that can be used to search, filter and/or browse to locate specified content. The Moving Picture Experts Group (MPEG) has promulgated a Multimedia Content Description Interface standard, commonly referred to as MPEG-7 to standardize content descriptions for multimedia information. In contrast to preceding MPEG standards such as MPEG-4, which define how to represent coded multimedia content, MPEG-7 specifies how to describe the multimedia content.

MPEG-4 specifies how to represent units of aural, visual or audiovisual content as media objects, each of which is represented as a single elementary stream. In MPEG-4, media objects are composed together to create audiovisual scenes. An audiovisual scene represents a complex presentation of different multimedia objects in a structured fashion. Within scenes, media objects can be natural, meaning captured from the world, or synthetic, meaning generated with a computer or other device. For example, a scene containing text and an image with an audio background would be described in MPEG-4 with media objects for the text, image, and audio stream, and a scene that describes how to compose the objects. The composition is represented by a scene graph made up of nodes for the media objects and nodes for composing the media objects into a scene. MPEG-4 audiovisual scenes are composed of media objects, organized into a hierarchical tree structure, which is called a scene graph. Primitive media objects such as still images, video, and audio are placed at the leaves of the scene graph. MPEG-4 standardizes representations for many of these primitive media objects, such as video and audio, but is not limited to use with MPEG-4 specified media representation. Each media object contains information to allow the object to be included into the audiovisual scene.

The primitive media objects are found at the bottom of the scene graph as leaves of the tree. More generally, MPEG-4 scene descriptions can place media objects spatially in two-dimensional (2-D) and three dimensional (3-D) coordinate systems, apply transforms to change the presentation of the objects (e.g. a spatial transform such as a rotation), group primitive media objects to form compound media objects, and sychronize presentation of objects within a scene. The MPEG-4 scene description builds on concepts from the Virtual Reality Modeling Language (VRML). The W3C has defined an XML-based representation of VRML scenes, called Extensible 3D (X3D). While MPEG-4 scenes are encoded for transmission in an optimized binary manner, MPEG has also defined an XML-based representation for MPEG-4 scene descriptions, called the Extensible MPEG-4 Textual format (XMT). XMT represents MPEG-4 scene descriptions using an XML-based textual syntax. Additional introductory information about MPEG-4 may be obtained from *Overview of the MPEG-4 Standard*, Koenen, R. ed., V.18—Singapore Version, March 2001 (ISO/IEC JTC1/SC29/WG11 N4030).

XMT can interoperate with SMIL, VRML, and MPEG-4 players. The XMT format can be interpreted and played back directly by an SMIL player and easily converted to the X3D format before being played back by a X3D or VRML player. XMT can also be compiled to an MPEG-4 representation, such as the MPEG-4 file format (called MP4), which can then be played by an MPEG-4 player. XMT contains two different formats: the XMT-A format and the XMT-Ω format. XMT-A is an XML-based version of MPEG-4 content that contains a subset of X3D with extensions to X3D to allow for representing MPEG-4 specific features. XMT-A provides a one-to-one mapping between the MPEG-4 textual and binary formats. XMT-Ω is a high-level version of an MPEG-4 scene based on SMIL.

With regard to the description of content, MPEG-7 may be used to describe MPEG-4, SMIL, HTML, VRML and other multimedia content data. MPEG-7 uses a Data Definition Language (DDL) that specifies the language for defining the standard set of description tools and for defining new description tools, and provides a core set of descriptors and description schemes. The DDL definitions for a set of descriptors and description schemes are organized into "schemas" for different classes of content. The DDL definition for each descriptor in a schema specifies the syntax and semantics of the corresponding feature. The DDL definition for each description scheme in a schema specifies the structure and semantics of the relationships among its children components, the descriptors and description schemes. The DDL may be used to modify and extend the existing description schemes and create new description schemes and descriptors. The format of the MPEG-7 DDL is based on XML and XML Schema standards. The descriptors, description schemes, semantics, syntax, and structures are represented with XML elements and XML attributes.

Using a movie as an example of multimedia content, a corresponding MPEG-7 content description would contain "descriptors" ("D"), which are components that describe the features of the movie, such as scenes, titles for scenes, shots within scenes, and time, color, shape, motion, and audio information for the shots. The content description would also contain one or more "description schemes" ("DS"), which are components that describe relationships among two or more descriptors, such as a shot description scheme that relates together the features of a shot. A description scheme can also describe the relationship among other description schemes, and between description schemes and descriptors, such as a scene description scheme that relates the different shots in a scene, and relates the title feature of the scene to the shots.

The MPEG-7 content description for a particular piece of content is defined as an instance of an MPEG-7 schema; that is, it contains data that adheres to the syntax and semantics defined in the schema. The content description is encoded in an "instance document" that references the appropriate schema. The instance document contains a set of "descriptor values" for the required elements and attributes defined in the schema, and for any necessary optional elements and/or attributes. For example, some of the descriptor values for a particular movie might specify that the movie has three scenes, with scene one having six shots, scene two having five shots, and scene three having ten shots. The instance document may be encoded in a textual format using XML, in a binary format such as the binary format specified for MPEG-7 data known as "BiM," and in a mixture of the two formats.

The instance document is transmitted through a communication channel, such as, for example, a computer network, to another system that uses the content description data contained in the instance document to search, filter and/or browse the corresponding content data stream. Typically, the instance document is compressed for faster transmission. An encoder component may both encode and compress the instance document. Further, the instance document may be generated by one system and subsequently transmitted by a different system. A corresponding decoder component at the receiving system uses the referenced schema to decode the instance document. The schema may be transmitted to the decoder separately from the instance document, may be transmitted to the decoder as part of the same transmission, or may be obtained by the receiving system from another source. Alternatively, certain schemas may be incorporated into the decoder.

With the growing popularity of digital devices such as personal computers, digital cameras, personal digital assistants (PDAs), cellular telephones, scanners and the like, multimedia data formatted according to well known standards is being created, edited and shared by all members of society, from hobbyists to neophytes to experts. Many standards govern the capturing, storage and transmission of multimedia data. The MPEG standards are widely accepted by manufactures of digital devices and are increasingly being incorporated into digital devices that allow for creation, editing and sharing of multimedia data.

BRIEF SUMMARY OF THE INVENTION

Transcoding between content data and description data. The transcoding may include transcoding content data to corresponding description data. Additional description information to complete the description data may be requested. The transcoding may include transcoding description data to content data, including seeking content data items that match the description data. Content data items that best match the description data may be selected and included in the content data. A user may be requested to select items from a group of matching content data items. The content data may be stored according to the Moving Pictures Expert Group-4 (MPEG-4) standard, and the description data may be stored according to the MPEG-7 standard. The transcoding may be achieved via rules stored in the Extensible Stylesheet Transformation (XSLT) format. The transcoding may be implemented on a computing device, such as a personal computer.

BRIEF DESCRIPTION OF THE DRAWINGS

The novel features of the invention will become apparent upon reading the following detailed description and upon reference to the drawings, in which:

FIG. 4A illustrates example content data in SMIL/XMT-Ω format.

FIG. 4B illustrates derived description data in MPEG-7 format corresponding to the content data shown in FIG. 4A.

FIG. 8 illustrates an example portion of an Extensible Stylesheet Transformation (XSLT) file containing rules which may be used in transcoding between MPEG-4 and MPEG-7 data.

FIG. 9 illustrates an environment in which an embodiment of the systems and methods described herein may be implemented.

DETAILED DESCRIPTION

The systems and methods described herein allow for transforming between content data and description data. More specifically, the transforming described herein involves transcoding between multimedia content data and description data. Authoring systems and methods described herein may make use of the transcoding methods. Data defined by the Moving Picture Experts Group MPEG-4 (MPEG-4) standard, the World Wide Web Consortium (W3C) Synchronized Media Integration Language (SMIL), the Virtual Reality Modeling Language (VRML), Extensible 3D (X3D), the Hypertext Markup Language (HTML), and other similar standards, is referred to herein as content data. Other standards, such as MPEG-7 (formally titled Multimedia Content Description Interface standard), specify a format for describing multimedia data. The data encompassed by the MPEG-7 standard is often referred to as metadata, which is data that describes other data. Data known as metadata and defined by MPEG-7 and other standards are referred to herein as description data. In one exemplary embodiment, the transcoding operates between SMIL or MPEG-4 content data and MPEG-7 description data. In other embodiments, the content data and description data may be represented in other well known formats.

The systems and methods described herein provide for automatically or semi-automatically mapping multimedia presentation data and its corresponding description data in a process called transcoding. Transcoding is achieved by applying a transformation process to the multimedia representation that operates on structured representations of the content data and the description data, such as XML. This transcoding process may be implemented on structured content representations such as MPEG-4 through XMT, SMIL, HTML, and VRML/X3D. The description data may be represented according to the MPEG-7 standard. The transcoding process may be achieved via rules specified using the Extensible Stylesheet Transformation (XSLT) standard. The transcoding methods may applied to assisted content authoring, thereby providing for interactivity and content adaptation.

The methods described herein provide for content data to description data transcoding. In this method for transcoding, the content data is taken as input and processed to obtain description data. In another method, the description data is taken as input and a transcoding process is applied to obtain content data where the content data matches the characteristics described by the description data. This method provides for description data to content data transcoding. In such cases, the mapping from description data to content data may be partial (i.e., not complete) because the description data does not have sufficient information from which content data may be fully constructed. As such, in this instance, the transcoding process produces partial content data, which may be referred to as a content data skeleton.

Figure 1:
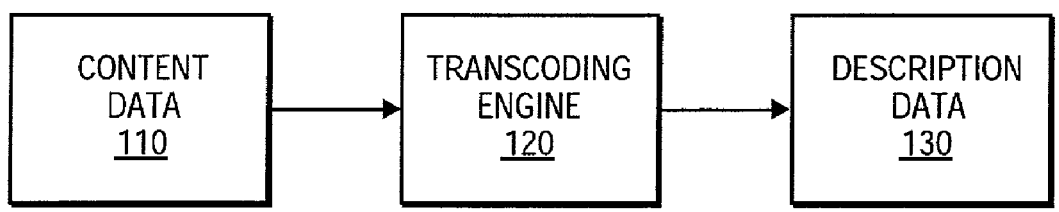
FIG. 1 illustrates an overview of a method for transcoding from content data to description data.

FIG. 1 illustrates an overview of a method for transcoding from content data to description data. Content data 110 is received as input by transcoding engine 120. Transcoding engine 120 applies a transcoding method described herein to produce description data 130. Transcoding engine 120 produces a description of the input content data 110 as output in the form of description data 130.

In one embodiment, the input content data is represented as an XML-based representation such as SMIL or the Extensible MPEG-4 Textual format known as XMT-Ω, which is a representation of MPEG-4 in XML and is similar to SMIL. (See *Information technology—Coding of audio-visual objects—Part* 1: *Systems Amendment* 2: *Textual Format*, ISO/IEC 14496–1:2001/FDAM2 ISO/SC29/WG11/ MPEG N4698) As such, the method may also be applied to MPEG-4 content data stored in other binary forms using well known methods, such as those disclosed in the MPEG-4 reference software for XMT: *Information Technology— Coding of Audio-Visual Objects—Part 5: Reference Software, AMENDMENT* 2: *MPEG-4 Reference Software Extensions for XMT and Media Nodes*, (ISO/IEC 14496- 52nd Edition/FPDAM 2 SC 29/WG 11 N4426). In this embodiment, both content data and the description data are XML documents. Therefore, the transcoding process is a transformation from one XML document to another XML document. In one embodiment the transcoding from content data to description data is implemented as a set of transformation rules that operate on the XML data structure that represents the input SMIL/XMT data. The content data in XML may also be represented according to the Document Object Model (DOM). The rules to transform the content data to description data may be written in the form of the extensible stylesheet language (XSL) and the extensible stylesheet language transformations (XSLT). (See *Extensible Stylesheet Language (XSL)*, Version 1.0, W3C Recommendation, Oct. 15, 2001 and *XSL Transformations (XSLT)*, Version 1.0, W3C Recommendation, Nov. 16, 1999 and *Document Object Model (DOM) Level* 2 *Core Specification*, Version 1.0, W3C, Nov. 13, 2000 available from Massachusetts Institute of Technology, Laboratory for Computer Science, Cambridge, Mass.). That is, one or more XSLT files may control how the description data is extracted and derived from the multimedia content data.

Figure 2:
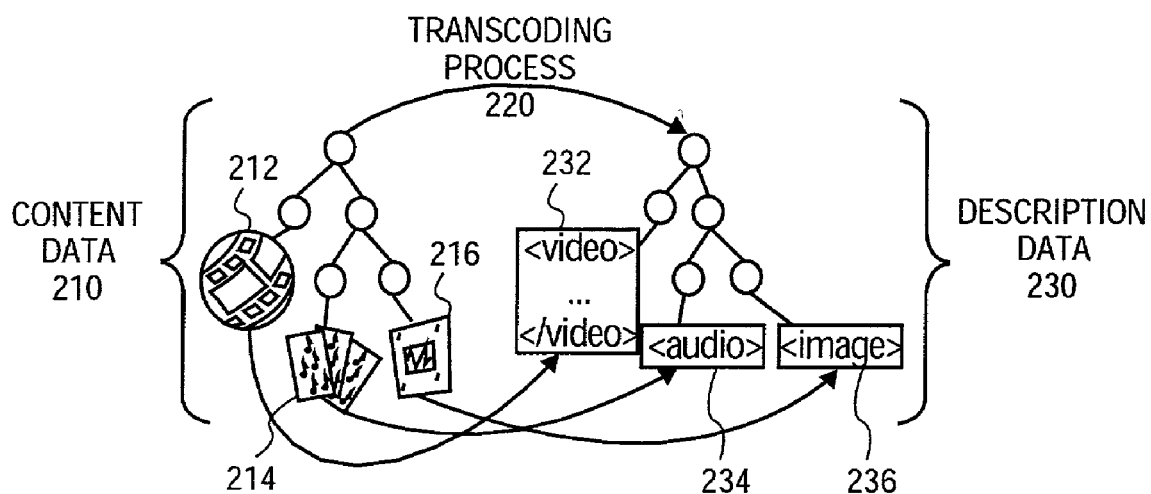
FIG. 2 illustrates a conceptual view of transcoding from content data to description data.

FIG. 2 illustrates a conceptual view of transcoding from content data to description data. Transcoding process 220 operates on the hierarchical audiovisual scene contained in content data 210 to create description data 230. For ease of explanation, the transcoding process may be broken down into two sub-processes: (1) structural transcoding, which maps the scene structure of the content data into corresponding description data having a similar structure, and (2) media transcoding, which extracts description data from media objects at the leaf nodes of the scene graph. While these two sub-processes may be implemented sequentially it will be obvious to those skilled in the art that these two sub-processes can be combined and implemented as a single process. In other embodiments, the process may be further broken down into multiple (more than two) sub-processes without departing from the methods described herein.

Figure 3:
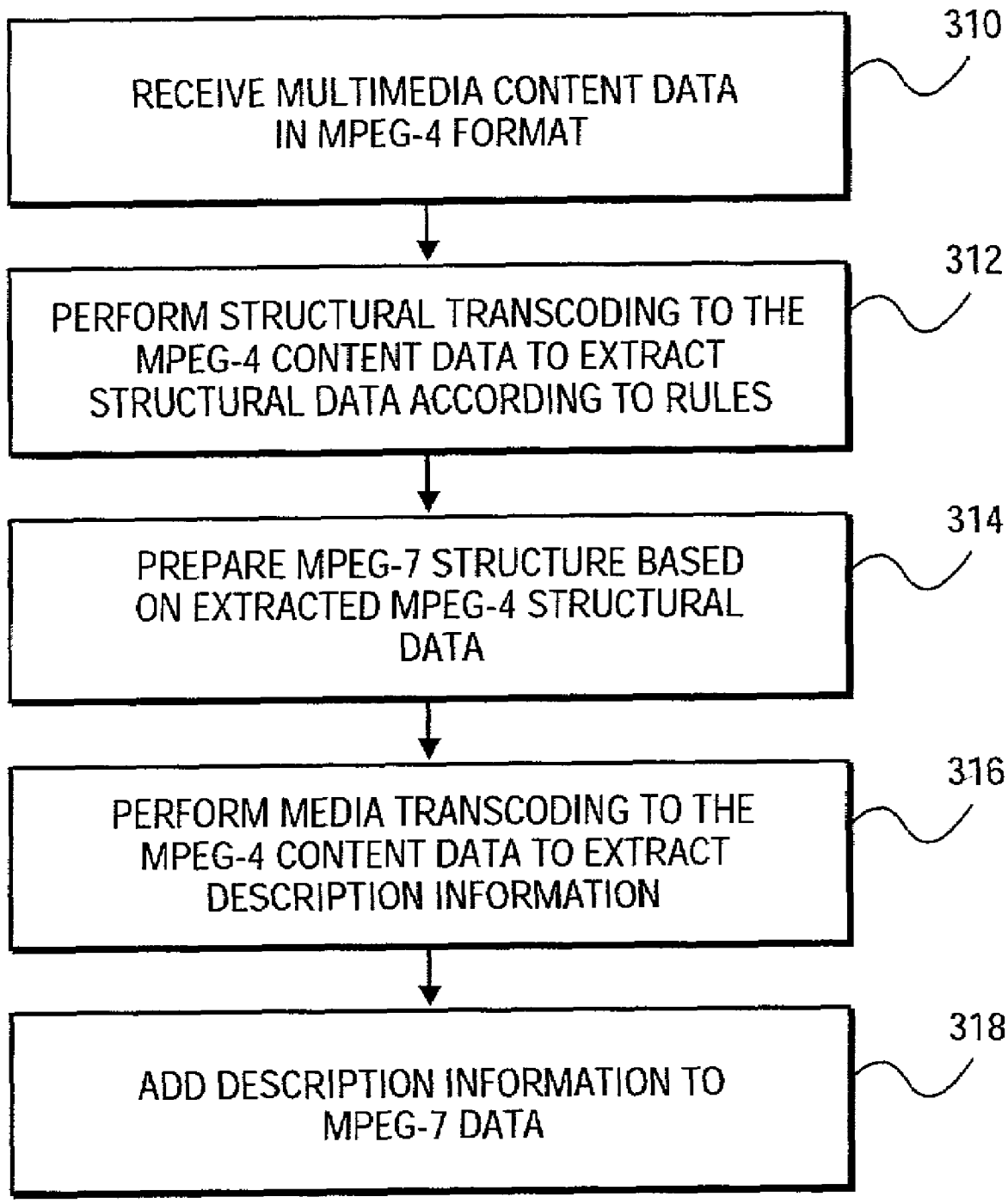
FIG. 3 illustrates a flow of actions taken according to an embodiment of a method described herein for transcoding from content data to description data.

FIG. 3 illustrates a flow of actions taken according to a method described herein for transcoding from content data to description data. In this embodiment, multimedia content data is received in MPEG-4 format as shown in block 310. Multimedia content data in MPEG-4 format may originate from devices that store multimedia content data in MPEG-4 format files; may be authored by the user of the system; and may be retrieved from a multimedia content database that is available locally and/or remotely. Examples of obtaining multimedia content data from a device include obtaining digital still photographs from a digital camera, obtaining a digital video stream or movie from a digital video camera, obtaining scanned-in images from a scanner, obtaining digital audio from an MP3 recorder, etc. Such multimedia content data may be easily and/or automatically stored on the hard drive or other storage device coupled with the user's computer. In one embodiment, an authoring tool may be integrated with a system that provides the methods described herein. The transcoding from content data to description data is achieved by implementing structural transcoding and media transcoding of the MPEG-4 content data to create MPEG-7 description data. Structural data may be extracted from the MPEG-4 multimedia content data by structural transcoding according to various rules, as shown in block 312. Multimedia structural data in MPEG-7 format based on the extracted structural data is prepared, as shown in block 314.

In the structural transcoding sub-process, the structure of an MPEG-4/SMIL scene is transformed into a corresponding MPEG-7 structural description. In MPEG-7 the structure of multimedia content is represented as a hierarchical decomposition into Segment description schemes of various types. The mapping process may be implemented as a recursive traversal of the scene in which each node in the scene graph is mapped to a corresponding MPEG-7 Segment description scheme such that the process is applied recursively to the children nodes of each node in order to obtain its MPEG-7 segment decomposition. For example, referring to FIG. 2, content data video clip source node 212 may be mapped to description data node 232, content data music node 214 may be mapped to description data audio node 234, and content data image node 216 may be mapped to description data image node 236. MPEG-7 segment decomposition is represented using the Decomposition part of the Segment description scheme. When the node being mapped is a leaf node, that is, a primitive media node, the type of the media is used to determine the appropriate MPEG-7 segment descriptor. For a visual object in the content data, the mapping will be to an MPEG-7 Video Segment description scheme if the content data includes a Moving Region Segment description. For a still image object, the mapping will be to a Still Region Segment description. For an audio object, the mapping will be to an Audio Segment description scheme. For non-leaf nodes, if the node combines nodes from multiple modalities, such as an audio and visual object, the mapping will be to a Multimedia Segment description scheme. When a content data node contains objects of the same type, the corresponding segment type for the description data will be the same as each of its child nodes. In other cases, the set of possible mappings are not limited to those described herein, and other mappings will be apparent to one skilled in the art.

This sub-process will result in one or more MPEG-7 segments for each object in an MPEG-4 scene. In addition, properties contained in the content data may be mapped to the corresponding segment description information in the description data without analyzing the media data itself. For example, information extracted from the MPEG-4 timeline for each node in a scene may be mapped into an MPEG-7 MediaTime descriptor which is included in the description data for that node's object. In addition, information about a moving object trajectory may be extracted from MPEG-4 content data and mapped into an MPEG-7 TemporalInterpolator descriptor of a MovingRegion description scheme. An MPEG-7 RegionLocator description scheme may extracted from the MPEG-4 content data by analyzing the shape coding representation of the MPEG-4 video object plane corresponding to the object.

The sub-process of structural transcoding may be implemented using a set of rules defined in the XSL language. Such rules define a pattern that matches a subtree of the input content data and produces as output a subtree of the description data. A rule matching engine, implemented in one embodiment in XSL, applies a set of such rules to implement the structural transcoding transformation described herein.

Description information may be extracted from the MPEG-4 content data by media transcoding, as shown in block 316. The description information is added to the structural data to complete the MPEG-7 description data, as shown in block 318. In the media transcoding sub-process, description data is extracted from the media objects contained in the scene. In one embodiment, analysis of the media data itself is performed to achieve this sub-process. Many extraction methods will be apparent to those skilled in the art, and this sub-process does not require any particular method to achieve the media transcoding sub-process. In one embodiment, MPEG-7 signal-level descriptors and media information descriptors are extracted from the media data. The MPEG-7 signal-level descriptors describe the characteristics of an audio or visual signal, such as the color characteristics of an image region or the volume of an audio segment. Low level visual features like color, shape, texture, etc. may be extracted automatically from video sources using algorithms such as those described in the *Multimedia Content Description Interface—Part 8 Extraction and Use of MPEG-7*, draft, ISO/IEC DTR 15938-8, ISO/SC29/WG11/N4579, Jeju Island, March, 2002. Similarly, low-level audio features such as spectrums, volume, silence, etc. may also be extracted using well known techniques such as those documented *Information Technology—Multimedia Content Description Interface—Part 4: Audio*, draft, ISO/IEC FDIS 15938-4, ISO/SC29/WG 11/N4224, Sydney, July, 2001.

Media descriptors describe the properties of the media data itself. One example of such a descriptor is the MediaLocator descriptor used within every MPEG-7 Segment description. This descriptor contains the location of a media and can be obtained automatically from the content data itself. Other media descriptors are contained in the MPEG-7 Media Information which contains information such as the size of an image, the length of a file in bytes, the number of bits used to represent color in the encoding, and so on. This information can be extracted from encoded media directly using methods that will be apparent to one skilled in the art.

FIG. 4A illustrates example content data in SMIL/XMT-Ω Format, and FIG. 4B illustrates derived description data in MPEG-7 format corresponding to the content data shown in FIG. 4A. The example of content data 400 shown in FIG. 4A presents two images, "image1.gif" and "image2.gif", on a screen for 20 seconds. The spatial layout of the presentation is described by the <region> tags 402 for each image contained within the <layout> tag 404. The media objects, represented by <image> tags 406 and 408, are contained within a <par> tag 410 that indicates that the two images are to be played in parallel for 20 seconds as indicated by the "dur" attribute.

The description data shown in FIG. 4B is the result of applying a transcoding method described herein to automatically transcode the content data 400 of FIG. 4A to description data 416. The structure of the SMIL content data presentation 400 has been mapped into description data 416 in the form of a hierarchical decomposition of MPEG-7 Segment description schemes. The entire presentation is represented by a single MultimediaSegment description scheme 420. The presentation is decomposed into a decomposition 430, enclosed within <MultimediaDecomposition> tag 424, into two StillRegion description schemes 440 and 450, one each for image1 and image2. In this example, MediaLocators 442 and 452 for each segment were added automatically. Furthermore, in this example, a visual description in the form of color histogram 446 has been extracted from image1 and is represented within <Visual-Descriptor> tag 448.

Figure 5:
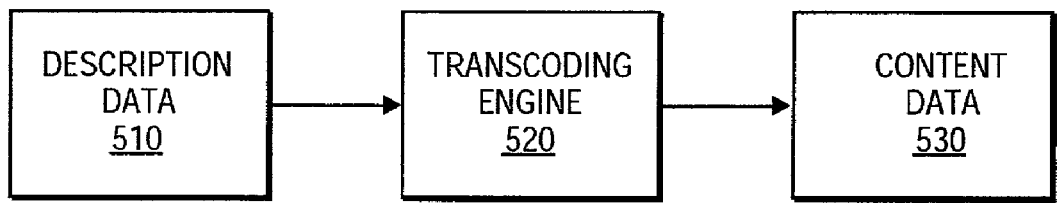
FIG. 5 illustrates an overview of a method for transcoding from description data to content data.

FIG. 5 illustrates an overview of a method for transcoding from description data to content data. Description data 510 serves as input to transcoding engine 520. While the content data contains in theory all of the data necessary to create the corresponding description data, the converse is not true. That is, in general, content data cannot normally be uniquely constructed from a description of the content because a description does not completely specify the content data. For example, given a description color feature describing the characteristics of an image, a corresponding image cannot be determined because there are an infinite number of images having those characteristics. As such, in processing description data 510, transcoding engine 520 requires some assistance to create content data 530. Taking these facts into consideration, the method described herein provides two features: (1) generation of a content skeleton and (2) content matching. Transcoding engine 520 generates a content skeleton from description data 510 by constructing a content scene description based on the description data. The transcoding engine populates the content scene description of the content skeleton with information derived from the description data. The transcoding engine may extract and map the hierarchical structure of the structural description of the description data into the content scene description. The transcoding engine may also extract other properties from the description data, such as spatial and temporal layout information. When the transcoding engine adds more details to the content skeleton, it is possible to construct a complete scene structure from the description data. For example, an MPEG-7 segment decomposition may be used to build a MPEG-4 audiovisual scene. The transcoding engine obtains the media objects at the leaves of the content skeleton using content matching.

The media objects at the leaves of the scene cannot always be fully determined from the description data, unless the description indicates an explicit location for the media content data. Therefore, the transcoding from description data to content data uses content matching to match the description to a library of available content data. For example, description data might contain a color histogram specifying an image with a reddish hue. In this example, the transcoding process may apply matching techniques to find content similar to the description, that is, images having characteristics that match the description data. Continuing with this example, such images would have a reddish hue. In this example, the number of matching images would likely be large or even infinite as infinite numbers of images have a reddish hue. It follows that more detailed, complex and unique description data will yield a smaller and more readily manageable number of matching content data.

In one embodiment, the content data and description data are both represented as XML documents, and the transcoding process is implemented as a transformation on XML data. This transformation can be implemented as a set of rules. There may be two types of rules: (1) simple transformation rules, and (2) similarity-based transformation rules. The simple transformation rules may include simple matching rules. The simple matching rules use the same mechanism described for transcoding from content to description data. That is, a rule specifies: (a) a matching condition that defines a pattern to be matched by a sub-tree in the description data, and (b) an output part that defines a content data sub-tree to be produced as output for the matching input description data sub-tree. In one embodiment, simple matching transformation rules are implemented as XSL transformation rules.

In general, transformation rules, including XSLT rules, express a deterministic transformation of one XML document structure to another. However, in some cases the transformation from description data to content data may need more flexibility. To handle such situations, similarity-based matching may be used. A similarity-based transformation rule consists of a pair of a matching condition or pattern and an output content data specification. Unlike simple transformation rules in which a rule applies if and only if a matching pattern is satisfied, when using similarity-based rules, the extent of a match is a matter of degree rather than a binary decision. In particular, the degree of a match between the matching condition of the rule and the input description data is determined by a similarity function. The similarity function returns a numeric value indicating the quality of the match between an input description sub-tree and the matching pattern. The methods described herein do not stipulate a specific similarity function, as any well known similarity function may be used. In one embodiment, the similarity function may be, for descriptors, based on weighted combinations of similarity functions, and, for textual fields, based on one or more of a variety of text-based similarity functions which are well known in the information retrieval field.

In one embodiment, similarity-based matching rules are implemented as an extension to an XSLT interpreter engine. An XSLT interpreter may assign a matching cost to rule matches so that a choice may be made among multiple matches. This facility may be extended to handle similarity-based matching as follows. The XSLT interpreter tests all similarity-based rules for a potential match at a given subtree. This matching process invokes appropriate similarity functions to determine the similarity between the match condition of each rule and the given subtree. The similarity functions may produce a similarity value or ranking. In one embodiment, the higher the value the closer the similarity. For example, if the functions produce results between 1 and 100, a subtree having a similarity value of 82 is more similar to the description data than a subtree having a value of 54. Other schemes for values, rankings, etc. may be used. The rule interpreter may use the similarity value to determine which rules to apply by choosing the rule with the best match, which is the match condition whose similarity function returns the highest value. In another embodiment, a user may be asked to provide feedback on matches through a user interface. In this embodiment, the matches may be pre-filtered so that only good matches are shown to the user. Good matches may be defined as matches exceeding a threshold value of the similarity value.

Figure 6:
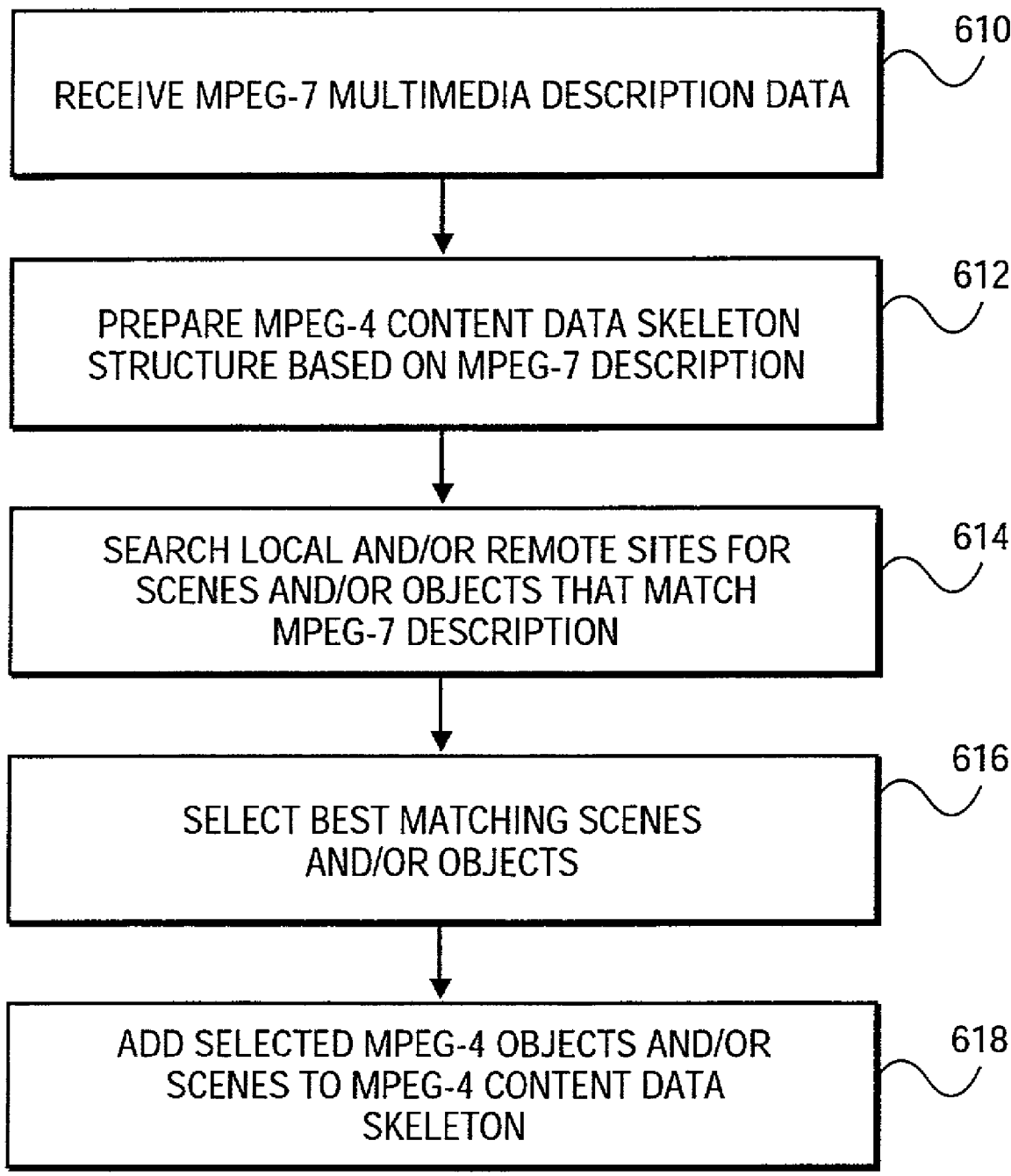
FIG. 6 illustrates a flow of actions taken according to an embodiment of a method described herein for transcoding from description data to content data.

FIG. 6 illustrates a flow of actions taken according to a method described herein for transcoding from description data to content data. A method for transcoding from description data to content data may be implemented using transform rules and may also include similarity-based matching rules. In an exemplary embodiment, the method of transcoding from description data to content data may be implemented using an XSLT interpreter that also includes similarity-based rule matching in which the content data and the description data are represented in an XML format. For example, the content data may be in MPEG-4 XMT format and the description data may be in MPEG-7 format.

In one embodiment, a transcoding engine may receive description data formatted as an MPEG-7 file, as shown in block 610. The structure of the content data may be computed using the reverse of the process described above for transcoding from content data to description data. That is, an MPEG-4 content data structural skeleton is prepared based on the structure of the MPEG-7 data, as shown in block 612. More specifically, the structure of the scene is generated from the MPEG-7 structural information, which is by definition encoded as a hierarchical decomposition of segments. For Segment description instances that represent media objects, the appropriate type of media object is placed as a leaf node in the hierarchical scene structure. For example, an MPEG-7 AudioSegment description scheme may be transformed into an <audio> object in SMIL/XMT-Ω. Similarly, a VideoSegment may be transformed into a <video> object. Similar kinds of transformations may be used for other types of segments. In addition, the MPEG-7 description may include a start time, the duration of subsegments, where the multimedia content may be found, and positions of objects in the scene. The MPEG-7 description data start time and subsegment duration may be stored as content data in the MPEG-4 MediaTime description scheme, where the media can be found may be stored in the MPEG-4 MediaLocator description scheme, and the positions of objects in the scene may be stored in the MPEG-4 RegionLocator description scheme. Further, trajectory information concerning objects in a scene may also be specified. An example is a bird flying from upper left to lower right within a scene. This information is transcoded from description data into the content data.

The transcoding from description data to content data may not be achieved fully automatically, as described above. In one embodiment, the description data is used as a specification for the desired content that is to be created to complete the transcoding process. To allow for user assisted completion of the transcoding, the transcoding engine may know the location of and/or seek user input specifying the location of media objects with associated description data that are available. These media objects may be grouped as sets of media objects and may be available locally or via remote communication techniques. The transcoding engine may search local and/or remote sites for media objects matching the description data, as shown in block 614. The transcoding engine may automatically select among these media objects one or more media objects that best match the description data that was specified as input to the transcoding process, as shown in block 616. The quality of the match may be determined by the similarity of the description in the description data to the description of the media objects selected. For example, a description of an image may indicate the desired color layout of an image with the center being reddish, the top being bluish and the some of the content items may be retrieved from an image library, such as, for example, the image libraries available from Corel Corporation, Ottawa, Ontario, Canada. In this example, MPEG-7 descriptors can this color layout for an image. When matched according to the similarity of the description data and the description of the available images, those images that most closely match the description may be retrieved. In another embodiment, description data is used to select from among a set of available scenes, where each scene has a definition that includes associated scene description data. Similar to content items, the selection of a scene can be implemented by matching the description of a scene in the input description data against the descriptions of all available scenes. A best matching scene or group of best matching scenes may be returned. The technique for determining the best match may be any well known matching method, including, computations using graph matching techniques well known in the pattern matching literature, such as, for example, the techniques described in *Content-Based Image Retrieval, Graph Model Matching/Indexing*, Berretti, S.; *A Dyadic Wavelet Affine Invariant Function For 2D Shape Recognition*, Khalil, M. I., and M. M. Bayoumi; and *Symbol Recognition By Error-Tolerant Subgraph Matching Between Region Adjacency Graphs* Llados, J., E. Marti, and J. J. Villanueva all in *IEEE Transactions on Pattern Analysis and Machine Intelligence*, October 2001.

The selected MPEG-4 objects and/or scenes are added to the content data skeleton, as shown in block 618. In this way, the MPEG-4 content data file is completed.

In one embodiment, the transcoding methods described herein may process parts of input description data or parts of input content data. That is, pieces of description data, such as an MPEG-7 Segment description scheme and parts of content data, such as objects in an MPEG-4 scene, may be transcoded separately. This allows for changes in either the content data and description data to be processed without requiring re-transcoding of the entire input document. As such this may be referred to as an incremental method. For example, if an object in an MPEG-4 scene is changed, only the subtree representing that object may need to be re-transcoded in an MPEG-7 description that includes the object. This embodiment is particularly efficient because the entire output content data or description data need not be entirely rewritten. The efficiencies result in both decreased processing time and decreased memory and storage device usage.

The transcoding methods described herein may be implemented in conjunction with methods for assisted authoring. In a content based assisted authoring method, content data is authored first and the authoring of description data for that content is assisted by applying the disclosed transcoding methods to the content data to derive description data. In a description based assisted authoring method, description data is given as input to an authoring system, a content data skeleton is prepared, and content data having characteristics matching the description data is sought. Another method is a hybrid of the content based and description based methods that allows for bi-directional authoring of content and description data. This hybrid method may begin with content data, description data, or an integrated group of data that includes both content data and description data. In the hybrid method, whenever changes are made to content data, if appropriate, the description data is automatically updated based on the content data changes; whenever changes are made to the description data, if appropriate, additional content data is automatically sought. In this way, changes to one of the content data and the description data are mirrored in the other. No significance is implied by the order in which the methods are described herein.

Methods for authoring audiovisual scene content, such as a SMIL or MPEG-4, are well known to those skilled in the art. In one embodiment of the content-based authoring method, the method for transcoding from content data to description data is incorporated into the authoring tool so that the transformation to description data is performed while the user is creating the content. For efficiency, the transcoding can use the incremental method described above so that only the changed parts of content data are re-transcoded into description data. For example, the addition of a new media object to a scene may require description data for that object to be transcoded but does not require that the content data for existing objects in the scene be re-transcoded. Such an authoring system is considered to be assisted because the description data for the content is created at the same time as the content is being authored. The transcoding engine monitors the content authoring and concurrently creates description data for the content being authored. In one embodiment an MPEG-4 or SMIL authoring system is extended with the transcoding rules so that the MPEG-7 description data is continuously transcoded from the content data such that the users modifications to the MPEG-4 or SMIL content scene being authored are reflected immediately into an MPEG-7 description of that scene.

In some cases, only a limited amount of description data may be transcoded from the content data. In particular, the extraction and preparation of MPEG-7 description data from MPEG-4 content data may leave gaps in the content description. In one embodiment, a request for additional MPEG-7 description data from the user is made to fill in the gaps in the MPEG-7 multimedia description data. According to the authoring methods described herein, additional MPEG-7 description data may be requested from a user according to any well-known user interface methods, and may be part of an authoring tool for description data which is incorporated with the system described herein. For example, if the multimedia data is a video object that includes multiple image objects within a scene, color descriptors may automatically be derived for each object; but a request is made to the user to obtain a textual description of various characteristics of each of the objects in the scene. More specifically, a user may be prompted to provide various information, such as, for example, the type of subject depicted by the object (e.g human bridge), a name of the subject depicted by the object (e.g. George Bush, Golden Gate Bridge), a geographic designation of the location type (e.g. press conference, bay) or of a name of a specific place (e.g. Washington D.C., San Francisco, Calif., U.S.A.) depicted in the object, etc. In one embodiment, during the preparation of the multimedia description data, the method may insert placeholders in the MPEG-7 skeleton where additional information will later be requested after an initial MPEG-7 description is prepared. That is, an MPEG-7 description may include one or more slots or empty branches which are tagged to later cause the system to request additional MPEG-7 description data from the user. A user may augment and manipulate the MPEG-7 multimedia description data. In this way, the user may correct and supplement the description information that was derived by the method or provided by the user.

In one embodiment of a description-based authoring method, an MPEG-7 multimedia description is provided as input. The description is transcoded to content data using an embodiment of the method for transcoding from description to content data described herein. As discussed above regarding the transcoding from content data to description data method, the rules may be in XSLT format. The resulting content data is presented to the user through an interactive content authoring tool interface, such as an MPEG-4 or SMIL authoring tool. This approach allows a user to author the content by describing it. This approach may be termed description-centric authoring. Local and/or remote databases are consulted to search for content data that includes scenes and media objects that match the MPEG-7 description data. In one embodiment, the local and/or remote databases searched may be determined by system default, and/or may be specified by a user of the system upon initial configuration. The system provides the matching multimedia content data to the user, allowing the user to select and/or accept the retrieved scenes and media objects that match the MPEG-7 description data. More specifically, when only one MPEG-4 multimedia content data file is found to match a particular object sought for a corresponding portion of the MPEG-7 multimedia description, the method may provide the user the option to accept or reject the lone found MPEG-4 multimedia content data file. When two or more MPEG-4 multimedia content data files are found that match a portion of the MPEG-7 description data, the method may provide the user the option to select between the two or more MPEG-4 content data files that provide matching scenes or media objects. The number of matching MPEG-4 files that include objects with characteristics that match the MPEG-7 description which are presented to a user may be limited by a system or user defined maximum. The closeness of the sought after MPEG-4 data to the MPEG-7 description may be referred to as a matching threshold and may be defined by the system, or may be customizable by the user. That is, for example, the system or user may specify that only MPEG-4 objects that match 80% of the information provided in the MPEG-7 description be listed. Moreover, in another embodiment, MPEG-4 files that exceed a matching threshold may automatically be retrieved, and, depending on the number retrieved, the number of MPEG-4 files may be pared down to a more reasonably sized group, should the group be large. That is, if, for example, 500 files are returned, only the best matching 50 files may be listed. In one embodiment, only a description of the matching content is provided to the user so as to reduce retrieval and display time. In this embodiment, remotely available content data is only downloaded to the user when it is accepted and selected. In another embodiment, a description accompanied by a thumbnail, reduced size, or reduced resolution version of the content data may be provided to the user to similarly reduce retrieval and display time. In yet another embodiment, some or all matching content data is retrieved, and matching data meeting system or user defined thresholds is presented to the user. The selected and accepted MPEG-4 multimedia content data is added to the MPEG-4 content data skeleton. Description data from the selected and accepted MPEG-4 scenes and objects is added to the MPEG-7 multimedia description data.

Figure 7:
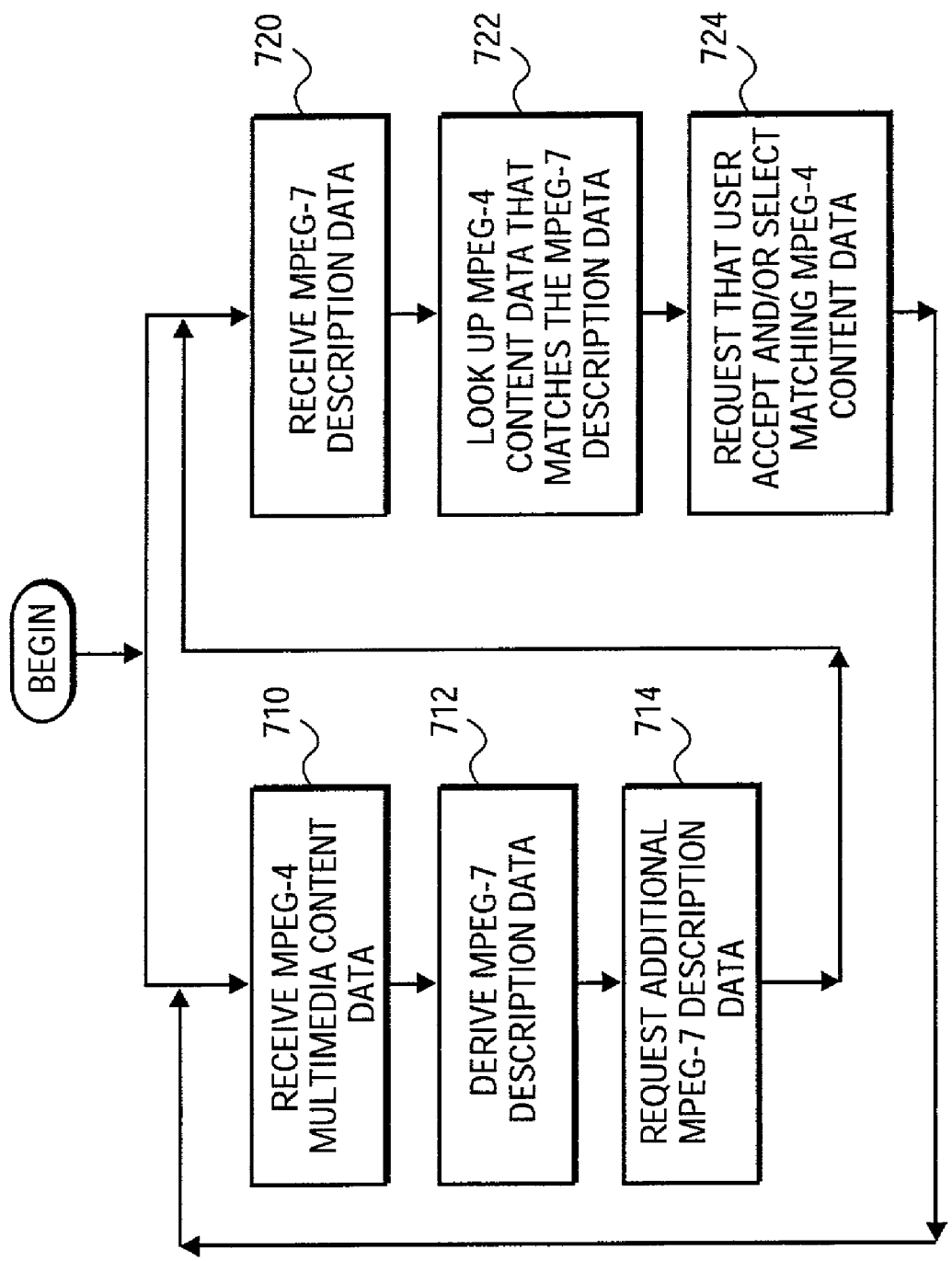
FIG. 7 illustrates a flow of actions taken according to a hybrid embodiment of an authoring method described herein.

FIG. 7 illustrates a flow of actions taken according to an embodiment of a hybrid authoring method described herein. The hybrid authoring method described herein incorporates some of the features of the content to description transcoding method and the description to content transcoding method described previously with regard to FIG. 3 and FIG. 6. In one embodiment, the hybrid authoring method includes the incorporation of an authoring tool in which a user may start out by either creating an MPEG-4 multimedia content file or entering MPEG-7 description data. In another embodiment, a user may start out with existing paired MPEG-4 content data and corresponding MPEG-7 description data and choose to edit either one. Generally, this method provides for automatic mirrored bi-directional transcoding in which changes made to content or description data are automatically transcoded into the other; user assistance is sought where needed.

According to the hybrid authoring method, MPEG-4 multimedia content data is received, as shown in block 710, or MPEG-7 description data is received, as shown in block 720. Upon receipt of MPEG-4 multimedia content data, as shown in block 710, the system derives MPEG-7 description data, as shown in block 712. Based on the deriving the MPEG-7 description data in block 712, a request for additional MPEG-7 description data is issued to the user, as shown in block 714. As discussed herein regarding the content based authoring method, additional information may be obtained from a user to complete the MPEG-7 description. The flow of execution continues with block 720 in which the MPEG-7 description data requested in block 714 is received. A search for MPEG-4 content data having characteristics that match the MPEG-7 description data in local and/or remote databases is undertaken, as shown in block 722. In this way, the MPEG-4 content data is updated to mirror any additional MPEG-7 description data added in block 714.

Via well known user interface techniques, a user is requested to accept and/or select matching MPEG-4 content data, as shown in block 724. In one embodiment, the matching MPEG-4 content data may be provided to the user in a ranked order based on the evaluated similarity of the content data to the description data. Such rankings may be evaluated according to methods described herein. The flow of execution continues at block 710 where the MPEG-4 multimedia content data that has been accepted and/or selected is received. MPEG-7 description data is derived based on the received MPEG-4 multimedia content, as shown in block 712. In this way, just as with regard to block 722, any changes or modifications to the MPEG-4 multimedia content data are reflected in the MPEG-7 description data. As discussed above, slots, choice elements, or other place holders such as hooks may be inserted into the XSLT stylesheet to request user guidance at various points in the transcoding. Similarly, the same place holders or hooks may be temporarily incorporated explicitly in the MPEG-7 description data and/or the MPEG-4 multimedia content data. According to this method, when MPEG-4 content data is added or edited, MPEG-7 description data is derived and additional MPEG-7 description data is sought to complete the MPEG-7 description data that corresponds to the MPEG-4 content. Similarly, when MPEG-7 description data is added or edited, MPEG-4 data is derived, when appropriate, and additional MPEG-4 content data may be sought to complete the MPEG-4 content data that corresponds to the MPEG-7 description. This mirrored automatic transcoding may occur in real time and is enhanced by the use of transcoding rules in XSLT.

FIG. 8 illustrates an example portion of an Extensible Stylesheet Transformation (XSLT) file containing rules which may be used in transcoding between MPEG-4 content data and MPEG-7 description data. This example shows two rules for transcoding SMIL XML content data to an MPEG-7 description. The first rule, rule 810, transcodes an SMIL <par> or <seq> construct 812 to an MPEG-7 Multimedia Segment 814. The second rule, rule 820, maps an <img> tag 822, which represents an image object, to an MPEG-7 Still Region description 824.

The methods disclosed herein may be implemented in software, hardware, and a combination of software and hardware such as firmware. FIG. 9 illustrates an environment in which an embodiment of the transcoding and authoring methods described herein may be implemented. In one embodiment, the methods described herein may be implemented on a computing device, such as personal computer 900 and other computing devices, including, for example, PDAs, cellular telephones, portable computers, laptop computers, computer workstations, computing tablets, and the like. In one embodiment, personal computer 900 includes processor 910 and memory 912. In one embodiment, software that executes the various embodiments of the methods described herein may be executed by processor 910. Processor 910 may be any computer processor or microprocessor, such as, for example, and Intel® Pentium® 4 processor available from Intel Corporation of Santa Clara, Calif., and memory 912 may be any random access memory (RAM). User input may be received via Universal Serial Bus (USB) controller 914 to which user input devices such as keyboard 916, mouse 918, trackball (not shown), pen and tablet (not shown), etc. are connected. Audio may be presented to a user via audio controller 920 to which speakers 922 are connected. Graphics, images, video and text may be presented to a user by graphics controller 924 to which display 926 is coupled. Network interface 930 may be an analog modem, a cable modem, a digital modem, a network interface card, and other network interface controllers that allow for communication via a wide area network (WAN) such as Internet 950, via a local area network (LAN), via well-known wireless standards, etc.

In one embodiment, computer instructions in the form of software programs may be stored on disk drive 940. The software that may implement the methods described herein may be referred to, in one embodiment, as transcoding software 942, multimedia database 944, authoring software 946 and capturing software 948. In one embodiment, capturing software 948 may consist of drivers and/or software programs which allow for obtaining content data from devices which may be local, remote, internal and external. Transcoding software 942 may provide for the extraction of description data from the content data and the preparation of a description data skeleton based on the content data. Transcoding software 942 may also provide for the receipt of description data and initiate a search for matching content data. To accomplish this search, the transcoding software may access multimedia database 944, as well as other local and remote databases. Authoring software 946 may provide a user interface which allows for the specification of description data, for the selection and acceptance of content data, and for the creating and editing of both multimedia content data and multimedia description data.

Each of these software components may be combined to form a single software entity, or may be broken down into other combinations in addition to or in place of the described software components to implement the methods described herein. This computer software may be downloaded via Internet 950 or other WAN or LAN through network interface 930 to personal computer 900 and stored in memory 912 and/or disk drive 940. In various embodiments, disk drive 940 may be any machine readable medium, including magnetic storage devices such as hard disk drives and floppy disk drives, optical storage devices such as compact disk read-only memory (CD-ROM) and readable and writeable compact disk (CD-RW) devices, readable and writeable digital versatile disk (DVD) devices, RAM, read-only memory (ROM), flash memory devices, stick memory devices, electronically erasable programmable read-only memory (EEPROM), and other silicon devices. In various embodiments, one or more machine readable media may be coupled locally, such as disk drive 940, or may be accessible via electrical, optical, wireless, acoustic, and other means from a remote source, including via a network.

In one embodiment, each of processor 910, memory 912, USB controller 914, audio controller 920, graphics controller 924, disk drive 940, and network interface 930 are coupled to bus 928, by which each of these devices may communicate with one another. In various embodiments, two or more buses may be included in personal computer 900. In addition, in various embodiments, two or more of each of the components of personal computer 900 may be included in personal computer 900. It is well known that personal computer 900 includes and operating system such as Microsoft® Windows® XP available from Microsoft Corporation of Redmond, Wash.

In one embodiment, a user of personal computer 900 may obtain multimedia data from a remote source by communicating over Internet 950 with another computing device, such as from multimedia server 960. The other computing device may be affiliated with a retail or other commercial entity from which multimedia data may be obtained, may be a computer at a remote location such as a second home of the user or another campus of a company, etc. In this embodiment, multimedia server 960 may include a multimedia database 962. Personal computer 900 may communicate with multimedia server 960 to obtain multimedia data from multimedia database 962 and store the downloaded multimedia data in multimedia data base 944. Each of these databases may support any well known database language including, for example, the structured query language (SQL). In one embodiment, multimedia server 960 may have a configuration similar to personal computer 900 or may be any well-known server computer, workstation and the like. Multimedia server 960 may include two or more computers arranged as a cluster, group, local area network (LAN), subnetwork, or other organization of multiple computers. In addition, when comprised of multiple computers, multimedia server 960 may include routers, hubs, firewalls, and other networking devices. In this embodiment, multimedia server 960 may include multiple specialized servers such as, for example, graphics servers, transaction servers, applications servers, database servers, and the like. In one embodiment, multimedia server 960 may rely on one or more third parties (not shown) to provide transaction processing, and/or other information and processing assistance over Internet 950 or via a direct connection.

In one embodiment, a user of personal computer 900 may obtain multimedia data, and especially content data, from a digital device such as a video camera, digital camera, scanner, cellular telephone, PDA, portable computer, personal computer, computing tablet or other similar computing device shown as media device 970. Media device 970 may be any computing device that may provide media data in a well known format to personal computer 900 via electrical, optical, wireless, acoustic, and other means according to any well known communications standards, including, for example, USB via USB controller 914, I.E.E.E. 1394 more commonly known has I.Link® and Firewire®, Bluetooth™, and the like, as well as over the Internet 950 via network interface 930.

In the foregoing specification, the invention has been described with reference to specific embodiments thereof. It will be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    transcoding content data, wherein the transcoding includes structural transcoding to extract a structure for the content data and media transcoding to extract description information for the content data; and
    generating description data from the structure and description information, wherein the description data has a structure corresponding to the structure of the content data and the description information is added into the structure of the description data.

2. The method of claim 1 wherein the media transcoding comprises:
    extracting descriptors from the content data to obtain corresponding description information.

3. The method of claim 2 wherein extracting the descriptors comprises:
    analyzing each of a plurality of media objects in the content data to obtain the corresponding description information.

4. The method of claim 1 wherein the transcoding is based on a set of mapping rules.

5. The method of claim 4 wherein each of the mapping rules in the set of mapping rules comprises:
    a matching condition; and
    a subpart of description data to be generated when the matching condition is met.

6. The method of claim 1 wherein the content data and the description data are each represented in an Extensible Markup Language (XML) format.

7. The method of claim 6 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

8. The method of claim 4 wherein the mapping rules are implemented in an Extensible Stylesheet Transformation (XSLT) format.

9. The method of claim 1 wherein the structural transcoding and the media transcoding process the content data to obtain a temporal layout and a spatial layout of the description data.

10. The method of claim 1 further comprising:
    requesting additional description information during the transcoding;
    receiving additional description information; and
    updating the description data based on the additional description information.

11. The method of claim 1 further comprising:
    receiving modifications to the content data;
    updating the content data based on the modifications to the content data; and
    updating the description data based on the modifications to the content data.

12. The method of claim 11 wherein the updating the description data comprises:
    mapping the modifications to the content data to corresponding changes to the description data.

13. The method of claim 11 wherein the updating the description data comprises:
    performing additional transcoding only on modified portions of the content data.

14. The method of claim 11 further comprising:
    requesting further description information based on the modifications to the content data;
    receiving further description information; and
    updating the description data based on the further description information.

15. The method of claim 1 wherein the transcoding comprises recursively applying the structural transcoding and the media transcoding to all nodes of the content data beginning with a root node.

16. A method comprising:
    receiving content data;
    transcoding the content data to obtain transcoded description data, wherein the transcoded description data is generated with a structure corresponding to a structure extracted from the content data and the transcoded description data includes description information extracted from the content data;

requesting additional description information;

receiving additional description information; and generating a description data file based on the transcoded description data and the additional description information.

17. The method of claim 16 wherein the transcoding comprises:

performing structural transcoding on the content data to extract the structure from the content data; and performing media transcoding on the content data to extract the description information from the content data.

18. The method of claim 16 further comprising:

receiving modifications to the content data;

updating the content data file based on the modifications to the content data; and updating the description data file based on the modifications to the content data.

19. The method of claim 18 wherein the updating the description data file comprises:

mapping the modifications to the content data as corresponding changes to the description data file.

20. The method of claim 18 wherein the updating the description data file comprises:

performing additional transcoding only on modified portions of the content data.

21. The method of claim 18 further comprising:

requesting further description information based on the modifications to the content data;

receiving further description information; and updating the description data file based on the further description information.

22. The method of claim 16 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

23. A method comprising:

transcoding description data to extract structural information from the description data and to identify matching content data items for the description data; and generating content data, wherein an internal structure of the content data corresponds to the structural information from the description data and the content data comprises the matching content data items.

24. The method of claim 23 wherein the extracting comprises:

obtaining a temporal layout and a spatial layout from the description data.

25. The method of claim 23 wherein the transcoding comprises:

searching for content data items having characteristics that match the description data;

selecting particular matching content data items from the group of content data items; and adding the particular matching content data items to the content data.

26. The method of claim 23 wherein the identifying is based on a similarity function.

27. The method of claim 23 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

28. The method of claim 23 wherein the transcoding is performed a using a set of mapping rules.

29. The method of claim 28 wherein each of the mapping rules in the set of mapping rules comprises:

a matching condition; and a subpart of content data to be generated when the matching condition is met.

30. The method of claim 28 wherein the mapping rules are implemented in the Extensible Stylesheet Transformation (XSLT) format.

31. The method of claim 23 wherein the content data items include a plurality of scenes.

32. The method of claim 23 wherein the content data items include a plurality of media objects.

33. The method of claim 23 wherein the transcoding and generating are performed recursively on all nodes of the description data, beginning with a root node.

34. A method comprising:

receiving description data;

extracting a content structure from the description data;

searching for content data items having characteristics that match the description data;

generating a matching content data list based on the searching;

presenting the matching content data list to a user;

receiving a user designation of user selected content data items from the matching content data list; and generating the content data, wherein the content data has a structure corresponding to the structure from the description data and the content data comprises the user selected content data items.

35. The method of claim 34 further comprising:

requesting additional description information from the user regarding the user selected content data items;

receiving additional description information from the user; and updating the description data based on the additional description information.

36. The method of claim 34 further comprising:

receiving modifications to the description data; and updating the description data based on the modifications to the description data to create modified description data.

37. The method of claim 36 further comprising:

searching for a group of matching content items having characteristics that match the modified description data; and reporting the group of matching content items to the user.

38. The method of claim 37 wherein the reporting comprises:

applying a similarity function to select a group of particular matching content items of the matching content items; and presenting the particular matching content items to the user.

39. The method of claim 37 further comprising:

requesting that the user select those of the matching content items to be added to the content data file; and receiving a user designation of those of the matching content items to be added to the content data file.

40. The method of claim 37 wherein the content items include a plurality of scenes.

41. The method of claim 37 wherein the content items include a plurality of media objects.

42. The method of claim 37 further comprising:
updating the content data based on the modifications to the description data.

43. The method of claim 36 wherein the updating the content data is based on a set of rules.

44. The method of claim 37 wherein the set of rules is implemented in the Extensible Stylesheet Transformation (XSLT) format.

45. The method of claim 34 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) formats, and the description data is represented in a Moving Picture Experts Group MPEG-7 format.

46. A system comprising:
a storage device, a memory, and a processor each coupled to a bus;
the storage device having instructions which when executed by the processor cause the system to perform actions including:
transcoding content, wherein the transcoding includes structural transcoding to extract a structure for the content data and media transcoding to extract description information for the content data; and
generating the description data from the structure and description information, wherein the description data has a structure corresponding to the structure of the content data and the description information is added to the structure of the description data.

47. The system of claim 46 wherein the media transcoding comprises:
extracting descriptors from the content data to obtain corresponding description information.

48. The system of claim 47 wherein the extracting comprises:
analyzing each of a plurality of media objects in the content data to obtain corresponding description information.

49. The system of claim 46 wherein the transcoding is based on a set of mapping rules.

50. The system of claim 49 wherein each of the mapping rules in the set of mapping rules comprises:
a matching condition; and
a subpart of description data to be generated when the matching condition is met.

51. The system of claim 46 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

52. The system of claim 49 wherein the mapping rules are implemented in an Extensible Stylesheet Transformation (XSLT) format.

53. The system of claim 46 wherein the structural transcoding and the media transcoding process the content data to obtain a temporal layout and a spatial layout of the description data.

54. The system of claim 46 having further instructions which when executed cause the system to perform further actions comprising:
requesting additional description information during the transcoding;
receiving additional description information; and
updating the description data based on the additional description information.

55. The system of claim 46 having further instructions which when executed cause the system to perform further actions comprising:
receiving modifications to the content data;
updating the content data based on the modifications to the content data; and
updating the description data based on the modifications to the content data.

56. The system of claim 55 wherein the updating the description data comprises:
mapping the modifications to the content data to corresponding changes to the description data.

57. The system of claim 55 wherein the updating the description data comprises:
performing additional transcoding only on modified portions of the content data.

58. The system of claim 55 having further instructions which when executed cause the system to perform further actions comprising:
requesting further description information based on the modifications to the content data;
receiving further description information; and
updating the description data based on the further description information.

59. The system of claim 46 wherein the transcoding comprises recursively applying the structural transcoding and the media transcoding to all nodes of the content data beginning with a root node.

60. A system comprising:
a storage device, a memory, and a processor each coupled to a bus;
the storage device having instructions which when executed by the processor cause the system to perform actions including:
receiving content data;
transcoding the content data to obtain transcoded description data, wherein the transcoded description data is generated with a structure corresponding to a structure extracted from the content data and the transcoded description data includes description information extracted from the content data;
requesting additional description information;
receiving additional description data; and
generating a description data file based on the transcoded description data and the additional description information.

61. The system of claim 60 wherein the transcoding comprises:
performing structural transcoding on the content data to extract the structure from the content data; and
performing media transcoding on the content data to extract the description information from the content data.

62. The system of claim 60 having further instructions which when executed cause the system to perform further actions comprising:
receiving modifications to the content data;
updating the content data file based on the modifications to the content data; and updating the description data file based on the modifications to the content data.

63. The system of claim 62 wherein the updating the description data file comprises:
   mapping the modifications to the content data as corresponding changes to the description data file.

64. The system of claim 62 wherein the updating the description data file comprises:
   performing additional transcoding only on modified portions of the content data.

65. The system of claim 62 having further instructions which when executed cause the system to perform further actions comprising:
   requesting further description information based on the modifications to the content data;
   receiving further description information; and
   updating the description data file based on the further description information.

66. The system of claim 60 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

67. A system comprising:
   a storage device, a memory, and a processor each coupled to a bus;
   the storage device having instructions which when executed by the processor cause the system to perform actions including:
     transcoding description data to extract structural information from the description data and to identify matching content data items for the description data; and
     generating the content data, wherein an internal structure of the content data corresponds to the structural information from the description data and the content data comprises the matching content data items.

68. The system of claim 67 wherein the extracting comprises:
   obtaining a temporal layout and a spatial layout from the description data.

69. The system of claim 67 wherein the transcoding comprises:
   searching for content data items having characteristics that match the description data;
   selecting particular matching content data items from the group of content data items; and
   adding the particular matching content data items to the content data.

70. The system of claim 67 wherein the identifying is based on a similarity function.

71. The system of claim 67 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

72. The system of claim 67 wherein the transcoding is performed a using a set of mapping rules.

73. The system of claim 72 wherein the mapping rules are implemented in the Extensible Stylesheet Transformation (XSLT) format.

74. The system of claim 67 wherein the transcoding and generating are performed recursively on all nodes of the description data, beginning with a root node.

75. A system comprising:
   a storage device, a memory, and a processor each coupled to a bus;
   the storage device having instructions which when executed by the processor cause the system to perform actions including:
     receiving description data;
     extracting a content structure from the description data;
     searching for content data items having characteristics that match the description data;
     generating a matching content data list based on the searching;
     presenting the matching content data list to a user;
     receiving a user designation of user selected content data items from the matching content data list; and
     generating content data, wherein the content data has a structure corresponding to the structure from the description data and the content data comprises the user selected content data items.

76. The system of claim 75 having further instructions which when executed cause the system to perform further actions comprising:
   requesting additional description information from the user regarding the user selected content data items;
   receiving additional description information from the user; and
   updating the description data based on the additional description information.

77. The system of claim 75 having further instructions which when executed cause the system to perform further actions comprising:
   receiving modifications to the description data; and
   updating the description data based on the modifications to the description data to create modified description data.

78. The system of claim 77 having further instructions which when executed cause the system to perform further actions comprising:
   searching for a group of matching content items having characteristics that match the modified description data data; and
   reporting the group of matching content items to the user.

79. The system of claim 78 wherein the reporting comprises:
   applying a similarity function to select a group of particular matching content items of the matching content items; and
   presenting the particular matching content items to the user.

80. The system of claim 78 having further instructions which when executed cause the system to perform further actions comprising:
   requesting that the user select those of the matching content items to be added to the content data file; and
   receiving a user designation of those of the matching content items to be added to the content data file.

81. The system of claim 78 having further instructions which when executed cause the system to perform further actions comprising:
   updating the content data based on the modifications to the description data.

82. The system of claim 81 wherein the updating the content data is further based on a set of rules.

83. The system of claim 82 wherein the set of rules is implemented in the Extensible Stylesheet Transformation (XSLT) format.

84. The system of claim 75 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

85. A machine readable medium having instructions which when executed by a processor cause the processor to perform actions including:
transcoding content data, wherein the transcoding includes structural transcoding to extract a structure for the content data and media transcoding to extract description information for the content data; and
generating the description data from the structure and description information, wherein the description data has a structure corresponding to the structure of the content data and the description information is added to the structure of the description data.

86. The machine readable medium of claim 85 wherein the media transcoding comprises:
extracting descriptors from the content data to obtain corresponding description information.

87. The machine readable medium of claim 86 wherein the extracting comprises:
analyzing each of a plurality of media objects in the content data to obtain the corresponding description information.

88. The machine readable medium of claim 85 wherein the transcoding is based on a set of mapping rules.

89. The machine readable medium of claim 88 wherein each of the mapping rules in the set of mapping rules comprises:
a matching condition; and
a subpart of description data to be generated when the matching condition is met.

90. The machine readable medium of claim 85 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

91. The machine readable medium of claim 88 wherein the mapping rules are implemented in an Extensible Stylesheet Transformation (XSLT) format.

92. The machine readable medium of claim 85 wherein the structural transcoding and the media transcoding process the content data to obtain a temporal layout and a spatial layout of the description data.

93. The machine readable medium of claim 85 having further instructions which when executed cause the processor to perform further actions comprising:
requesting additional description information during the transcoding;
receiving additional description information; and
updating the description information based on the additional description data.

94. The machine readable medium of claim 85 having further instructions which when executed cause the processor to perform further actions comprising:
receiving modifications to the content data;
updating the content data based on the modifications to the content data; and
updating the description data based on the modifications to the content data.

95. The machine readable medium of claim 94 wherein the updating the description data comprises:
mapping the modifications to the content data to corresponding changes to the description data.

96. The machine readable medium of claim 94 wherein the updating the description data comprises:
performing additional transcoding only on modified portions of the content data.

97. The machine readable medium of claim 94 having further instructions which when executed cause the processor to perform further actions comprising:
requesting further description information based on the modifications to the content data;
receiving further description information; and
updating the description data based on the further description information.

98. The machine readable medium of claim 85 wherein the transcoding comprises recursively applying the structural transcoding and the media transcoding to all nodes of the content data beginning with a root node.

99. A machine readable medium having instructions which when executed by a processor cause the processor to perform actions including:
receiving content data;
transcoding the content data to obtain transcoded description data, wherein the transcoded description data is generated with a structure corresponding to a structure extracted from the content data and the transcoded description data includes description information extracted from the content data;
requesting additional description information;
receiving additional description information; and
generating a description data file based on the transcoded description data and the additional description information.

100. The machine readable medium of claim 99 wherein the transcoding comprises:
performing structural transcoding on the content data to extract the structure from the content data; and
performing media transcoding on the content data to extract the description information from the content data.

101. The machine readable medium of claim 99 having further instructions which when executed cause the processor to perform further actions comprising:
receiving modifications to the content data;
updating the content data file based on the modifications to the content data; and
updating the description data file based on the modifications to the content data.

102. The machine readable medium of claim 101 wherein the updating the description data file comprises:
mapping the modifications to the content data as corresponding changes to the description data file.

103. The machine readable medium of claim 101 wherein the updating the description data file comprises:
performing additional transcoding only on modified portions of the content data.

104. The machine readable medium of claim 101 having further instructions which when executed cause the processor to perform further actions comprising:
requesting further description information based on the modifications to the content data;

receiving further description information; and
updating the description data file based on the further description information.

105. The machine readable medium of claim 99 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

106. A machine readable medium having instructions which when executed by a processor cause the processor to perform actions including:
transcoding description data to extract structural information from the description data and to identify matching content data items for the description data; and
generating the content data, wherein an internal structure of the content data corresponds to the structural information from the description data and the content data comprises the matching content data items.

107. The machine readable medium of claim 106 wherein the extracting comprises:
obtaining a temporal layout and a spatial layout from the description data.

108. The machine readable medium of claim 106 wherein the transcoding comprises:
searching for content data items having characteristics that match the description data;
selecting particular matching content data items from the group of content data items; and
adding the particular matching content data items to the content data.

109. The machine readable medium of claim 106 wherein the identifying is based on a similarity function.

110. The machine readable medium of claim 106 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

111. The machine readable medium of claim 106 wherein the transcoding is performed a using a set of mapping rules.

112. The machine readable medium of claim 111 wherein the mapping rules are implemented in the Extensible Stylesheet Transformation (XSLT) format.

113. The machine readable medium of claim 106 wherein the transcoding and generating are performed recursively on all nodes of the description data, beginning with a root node.

114. A machine readable medium having instructions which when executed by a processor cause the processor to perform actions including:
receiving description data;
extracting a content structure from the description data;
searching for content data items having characteristics that match the description data;
generating a matching content data list based on the searching;
presenting the matching content data list to a user;
receiving a user designation of user selected content data items from the matching content data list; and
generating content data, wherein the content data has a structure corresponding to the structure from the description data and the content data comprises the user selected content data items.

115. The machine readable medium of claim 114 having further instructions which when executed cause the processor to perform further actions comprising:
requesting additional description information from the user regarding the user selected content data items;
receiving additional description information from the user; and
updating the description data based on the additional description information.

116. The machine readable medium of claim 114 having further instructions which when executed cause the processor to perform further actions comprising:
receiving modifications to the description data; and
updating the description data based on the modifications to the description data to create modified description data.

117. The machine readable medium of claim 116 having further instructions which when executed cause the processor to perform further actions comprising:
searching for a group of matching content items having characteristics that match the modified description data data; and
reporting the group of matching content items to the user.

118. The machine readable medium of claim 117 wherein the reporting comprises:
applying a similarity function to select a group of particular matching content items of the matching content items; and
presenting the particular matching content items to the user.

119. The machine readable medium of claim 117 having further instructions which when executed cause the processor to perform further actions comprising:
requesting that the user select those of the matching content items to be added to the content data file; and
receiving a user designation of those of the matching content items to be added to the content data file.

120. The machine readable medium of claim 116 having further instructions which when executed cause the processor to perform further actions comprising:
updating the content data based on the modifications to the description data.

121. The machine readable medium of claim 120 wherein the updating the content data is further based on a set of rules.

122. The machine readable medium of claim 121 wherein the set of rules is implemented in the Extensible Stylesheet Transformation (XSLT) format.

123. The machine readable medium of claim 114 wherein the content data is represented in at least one of a Moving Picture Experts Group (MPEG) MPEG-4, a Hypertext Markup Language (HTML), a Synchronized Media Integration Language (SMIL), a Virtual Reality Modeling Language (VRML), and an Extensible 3D (X3D) format, and the description data is represented in a Moving Picture Experts Group MPEG-7 format.

* * * * *